US008073609B2

(12) United States Patent
Koch

(10) Patent No.: US 8,073,609 B2
(45) Date of Patent: Dec. 6, 2011

(54) SLIPPAGE CONDITION RESPONSE SYSTEM

(75) Inventor: Roger Dale Koch, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 534 days.

(21) Appl. No.: 12/314,827

(22) Filed: Dec. 17, 2008

(65) Prior Publication Data

US 2010/0152946 A1 Jun. 17, 2010

(51) Int. Cl.
*B60W 30/14* (2006.01)
*G06F 19/00* (2006.01)

(52) U.S. Cl. ............................ 701/93; 701/208; 701/82

(58) Field of Classification Search ........................ None
See application file for complete search history.

(56) References Cited

U.S. PATENT DOCUMENTS 5,436,839 A 7/1995 Dausch et al.
5,531,122 A 7/1996 Chatham et al.
5,646,844 A 7/1997 Gudat et al.
5,736,939 A 4/1998 Corcoran
5,956,250 A 9/1999 Gudat et al.
6,064,926 A 5/2000 Sarangapani et al.
6,173,215 B1 1/2001 Sarangapani
6,313,758 B1 11/2001 Kobayashi
6,336,051 B1 1/2002 Pangels et al.
6,442,456 B2 8/2002 Burns et al.
6,445,983 B1 9/2002 Dickson et al.
6,470,271 B2 10/2002 Matsunaga
6,484,089 B1 11/2002 Millington
6,636,807 B1 10/2003 Glasmacher et al.
6,711,838 B2 3/2004 Staub et al.
6,728,608 B2 4/2004 Ollis et al.
6,732,024 B2 5/2004 Wilhelm Rekow et al.

(Continued)

OTHER PUBLICATIONS

U.S. Appl. No. 12/314,826, entitled "Slippage Condition Response System,", filed Dec. 17, 2008 (24 pages).

(Continued)

*Primary Examiner* — Michael J. Zanelli
(74) *Attorney, Agent, or Firm* — Finnegan, Henderson, Farabow, Garrett & Dunner LLP

(57) ABSTRACT

A slippage condition response system for a machine is disclosed. The response system may have a sensing system configured to sense a parameter indicative of a slippage condition of the machine. Additionally, the response system may have a locator configured to sense a parameter indicative of a location of the machine. The response system may also have a map configured to store at least one known slippage condition location. Each known slippage condition location may have a slippage condition position and a modified speed limit. In addition, the response system may have a controller, which may be in communication with the sensing system, the locator, and the map. The controller may be configured to monitor the location of the machine, monitor the parameter indicative of a slippage condition of the machine, and update the map, based on the monitored parameter and the monitored location.

20 Claims, 4 Drawing Sheets

U.S. PATENT DOCUMENTS

| | | | | |
|---|---|---|---|---|
| 6,845,311 | B1 | 1/2005 | Stratton et al. | |
| 6,895,310 | B1 | 5/2005 | Kolls | |
| 6,996,462 | B2 | 2/2006 | Heilmann et al. | |
| 6,996,464 | B2 * | 2/2006 | Sorrells | 701/50 |
| 7,272,474 | B1 | 9/2007 | Stentz et al. | |
| 2003/0040849 | A1 | 2/2003 | Hathout et al. | |
| 2003/0114980 | A1 | 6/2003 | Klausner et al. | |
| 2004/0107042 | A1 * | 6/2004 | Seick | 701/117 |
| 2004/0122580 | A1 | 6/2004 | Sorrells | |
| 2005/0024492 | A1 | 2/2005 | Schaefer et al. | |
| 2005/0075760 | A1 | 4/2005 | Moisel et al. | |
| 2006/0025897 | A1 | 2/2006 | Shostak et al. | |
| 2006/0089766 | A1 | 4/2006 | Allard et al. | |
| 2006/0149425 | A1 | 7/2006 | Davis | |
| 2007/0040705 | A1 * | 2/2007 | Yoshioka et al. | 340/988 |
| 2008/0027590 | A1 | 1/2008 | Phillips et al. | |
| 2008/0065290 | A1 | 3/2008 | Breed et al. | |
| 2010/0004838 | A1 * | 1/2010 | Georgis et al. | 701/70 |

OTHER PUBLICATIONS

U.S. Appl. No. 12/213,934, entitled "Worksite Zone Mapping and Collision Avoidance System," , filed Jun. 26, 2008 (29 pages).

U.S. Appl. No. 11/974,240, entitled "Systems and Methods for Improving Haul Road Conditions," , filed Oct. 12, 2007 (36 pages).

U.S. Appl. No. 11/897,736, entitled "Performance-Based Haulage Management System," , filed Aug. 31, 2007 (32 pages).

U.S. Appl. No. 12/008,780, entitled "System and Method for Adjusting Machine Parameters," , filed Jan. 14, 2008 (30 pages).

* cited by examiner

SLIPPAGE CONDITION RESPONSE SYSTEM

TECHNICAL FIELD

The present disclosure relates generally to a response system and, more particularly, to a slippage condition response system.

BACKGROUND

Machines such as, for example, on and off-highway haul trucks and other types of heavy equipment are used to perform a variety of tasks. Some of these tasks involve traversing road surfaces, which may be rendered unpredictable by weather, usage patterns, tectonic shifts, mud slides, rock slides, mining, or other deteriorative events and/or processes. Machines can traverse these road surfaces with help from operators. For example, operators of the machines may adjust speeds and/or steering angles of the machines in anticipation of or in response to unpredictable road surfaces. Machines are, however, becoming increasingly automated.

One way to automatically control a machine in anticipation of or in response to an unpredictable road surface is to prevent the machine from traversing the unpredictable road surface. An example of this strategy is described in U.S. Pat. No. 6,313,758 (the '758 patent) issued to Kobayashi on Nov. 6, 2001. The '758 patent describes a control apparatus that allows processional travel with a leading vehicle driven by a driver and at least one succeeding vehicle automatically following the leading vehicle. Each of the vehicles comprises a communicator for communicating with other vehicles and a condition detector for detecting the condition of an object vehicle. Each of the vehicles also comprises an abnormality detecting device for determining the occurrence of an abnormality in the object vehicle, based on condition information detected by the condition detector. In addition, each of the vehicles comprises an abnormality signal transmitter for transmitting an abnormality signal, indicating the occurrence of an abnormality in the object vehicle, via the communicator. Additionally, each of the vehicles comprises an abnormality stop device for stopping the processional travel of at least one of the vehicles, including the vehicle that transmitted the abnormality signal, when the abnormality signal has been transmitted by one of the vehicles.

Although the control apparatus of the '758 patent may stop the processional travel of at least one of the vehicles of the '758 patent, the control apparatus does not modify a speed limit at a location where the abnormality occurred. Specifically, the control apparatus does not decrease the speed limit at the location where the abnormality occurred. Additionally, the control apparatus does not react to changing circumstances at the location where the abnormality occurred. In particular, the control apparatus does not resume normal operation of the vehicles at the location where the abnormality occurred.

The present disclosure is directed to overcoming one or more of the problems set forth above and/or other problems in the art.

SUMMARY

In one aspect, the present disclosure is related to a slippage condition response system for a machine. The response system may include a sensing system configured to sense a parameter indicative of a slippage condition of the machine. Additionally, the response system may include a locator configured to sense a parameter indicative of a location of the machine. The response system may also include a map configured to store at least one known slippage condition location. Each known slippage condition location may include a slippage condition position and a modified speed limit. In addition, the response system may include a controller, which may be in communication with the sensing system, the locator, and the map. The controller may be configured to monitor the location of the machine, monitor the parameter indicative of a slippage condition of the machine, and update the map, based on the monitored parameter and the monitored location.

In another aspect, the present disclosure is related to another slippage condition response system for a machine. The response system may include a locator configured to sense a parameter indicative of a location of the machine. Additionally, the response system may include a map configured to store at least one known slippage condition location. Each known slippage condition location may include a slippage condition position and a modified speed limit. The response system may also include a controller, which may be in communication with the locator and the map. The controller may be configured to monitor the location of the machine. The controller may also be configured to adjust a speed of the machine, based on the monitored location and the map.

In yet another aspect, the present disclosure is related to a method of responding to a slippage condition. The method may include monitoring a location of a first machine. Additionally, the method may include determining, based on the monitored location of the first machine, that the first machine is approaching a slippage condition position of a known slippage condition location stored in a map. The known slippage condition location may also include a modified speed limit. In addition, the method may include adjusting a speed of the first machine, based on the modified speed limit of the known slippage condition location.

DETAILED DESCRIPTION

Figure 1:
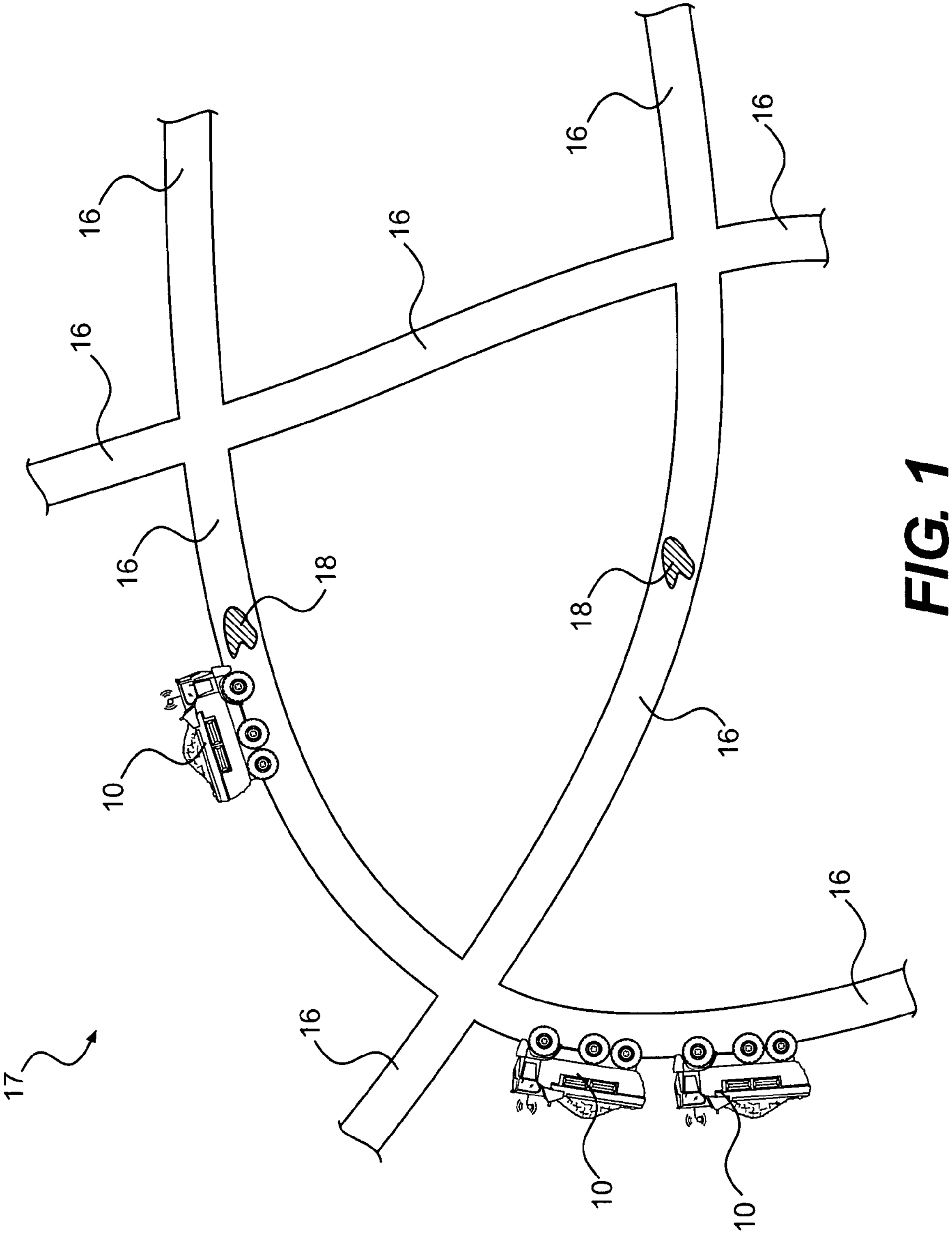
FIG. 1 is a pictorial illustration of exemplary disclosed machines at an exemplary disclosed worksite.

FIG. 1 illustrates exemplary machines 10, which may traverse road surfaces 16 of a worksite 17. Machines 10 may include mobile machines that perform some type of operation associated with an industry such as mining, construction, farming, freighting, or another industry. For example, machines 10 may be on or off-highway haul trucks, or other types of heavy equipment, which may haul load material. Alternatively, machines 10 may be loaders, graders, compactors, excavators, scrapers, skidsteers, passenger vehicles, or other types of mobile machines.

Worksite 17 may be, for example, a mine site, a landfill, a quarry, a construction site, a ski resort, a logging site, a road worksite, or another type of worksite known in the art. Road surfaces 16 may be, for example, gravel roads, quarry floors, concrete bridges, or other types of surfaces that machines 10 may traverse. This traversal may comport with speed limits of road surfaces 16. For example, the speed limits may be posted along road surfaces 16. Alternatively, the speed limits may be established by systems or operators of machine 10. In either case, the ground speed of each machine 10 (hereafter "machine 10") may be manually or automatically controlled such that it remains at or below the speed limits.

It is contemplated that road surfaces 16 may be rendered unpredictable by weather, usage patterns, tectonic shifts, mud slides, rock slides, mining, or other deteriorative events and/or processes. For example, road surfaces 16 that are rendered unpredictable may have unpredictable portions 18, which may include, for example, ice, mud, sand, loose gravel, or standing water. An unpredictable portion 18 may cause machine 10 to experience a slippage condition. As used herein, a slippage condition of machine 10 is an event that is objectively detected through analysis of sensed parameters. The slippage condition may or may not affect a heading and/or a location of machine 10. For example, the slippage condition may cause machine 10 to fishtail, irregularly accelerate (accelerate slower than expected), or irregularly decelerate (decelerate slower than expected). Alternatively or additionally, the slippage condition may cause one or more traction devices of machine 10 to rotate irregularly (faster or slower than expected). Although machine 10 may or may not have an operator, machine 10 may include a slippage condition response system 30, which may automatically control machine 10 in anticipation of or in response to slippage conditions.

The automatic control may include adjusting a speed and/or steering angle of machine 10 in anticipation of or in response to a slippage condition of machine 10. Alternatively or additionally, the automatic control of machine 10 may include, for example, modifying a speed limit in response to a slippage condition of machine 10. As used herein, modifying a speed limit means either (1) creating an exception to a posted speed limit, a speed limit established by a system (other than response system 30), and/or a speed limit established by an operator of machine 10 (all of which are hereafter referred to as an "original speed limit"); (2) updating an exception to an original speed limit; or (3) removing an exception to an original speed limit. For example, an exception to an original speed limit may include a known slippage condition location, which may have a slippage condition position, a modified speed limit, a traversal count, and/or a time. The slippage condition position may be indicative of a location where a slippage condition was experienced; the modified speed limit may be indicative of a speed limit at the slippage condition position; the traversal count may be indicative of a number of traversals of the slippage condition position at the modified speed limit without experiencing a slippage condition; and the time may be indicative of a time at which a slippage condition was last experienced at the slippage condition position.

Figure 2:
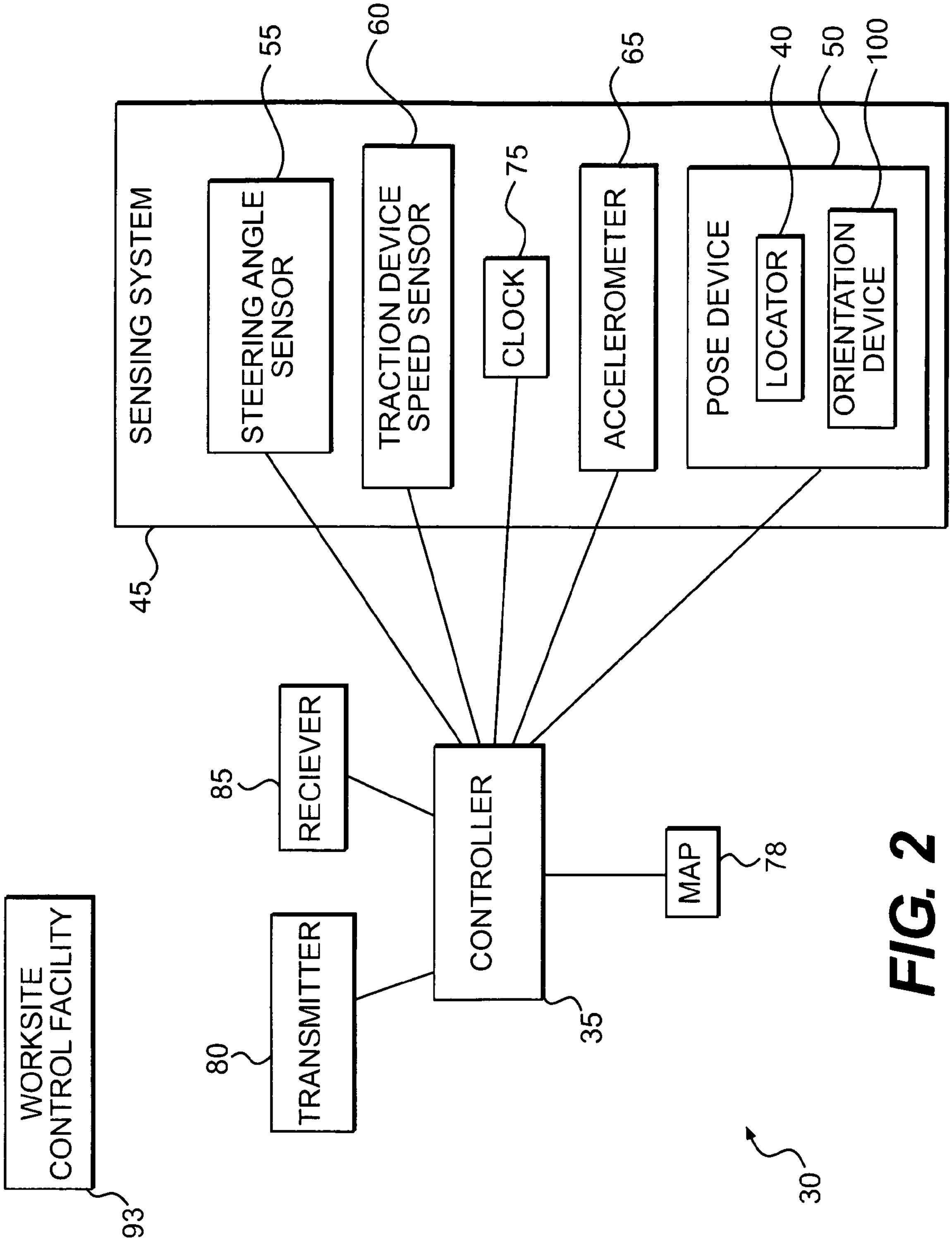
FIG. 2 is a diagrammatic illustration of an exemplary disclosed slippage condition response system for one of the machines of FIG. 1.

As illustrated in FIG. 2, response system 30 may have a controller 35, which may include one or more processors (not shown) and one or more memory devices (not shown). Controller 35 may communicate with a locator 40 to monitor a location of machine 10. Controller 35 may also communicate with sensors of a sensing system 45 to monitor parameters indicative of a slippage condition of machine 10. The sensors of sensing system 45 may be configured to sense these parameters. For example, the sensors of sensing system 45 may include a pose device 50 (a device for determining a location and an orientation), a steering angle sensor 55, a traction device speed sensor 60, an accelerometer 65, and/or a clock 75. In some embodiments, locator 40 may be included in pose device 50. Based on the communications with locator 40 and/or the sensors of sensing system 45, controller 35 may automatically adjust a speed and/or a steering angle of machine 10 in response to a slippage condition of machine 10.

Based on the communications with locator 40 and/or the sensors of sensing system 45, controller 35 may also communicate with and update a map 78, which may electronically store known slippage condition locations. This updating may include modifying speed limits by adding known slippage condition locations to or removing known slippage condition locations from map 78. Alternatively, the updating may be specific to one known slippage condition location and may include, for example, incrementing or setting the traversal count, setting the time, and/or modifying the speed limit by increasing or decreasing the modified speed limit. Although map 78 may be stored in the memory of controller 35, map 78 may alternatively or additionally be stored in the memory of an offboard system. Therefore, controller 35 may communicate with map 78 via a transmitter 80 and/or a receiver 85. In some embodiments, map 78 may be updated by the offboard system. For example, the offboard system may be another machine 10 and/or a worksite control facility 93 (e.g., a monitoring facility, a central data facility, a control facility, and/or another facility capable of communicating with controller 35). And, the updating may be direct or by way of communications with worksite control facility 93 and/or one or more machines 10. For example, the updating may occur when slippage condition positions of known slippage condition locations are repaired. Based on the communications with locator 40, the sensors of sensing system 45, and/or map 78, controller 35 may automatically adjust a speed and/or a steering angle of machine 10 in anticipation of a slippage condition of machine 10 at a slippage condition position of a known slippage condition location stored in map 78.

Figure 3:
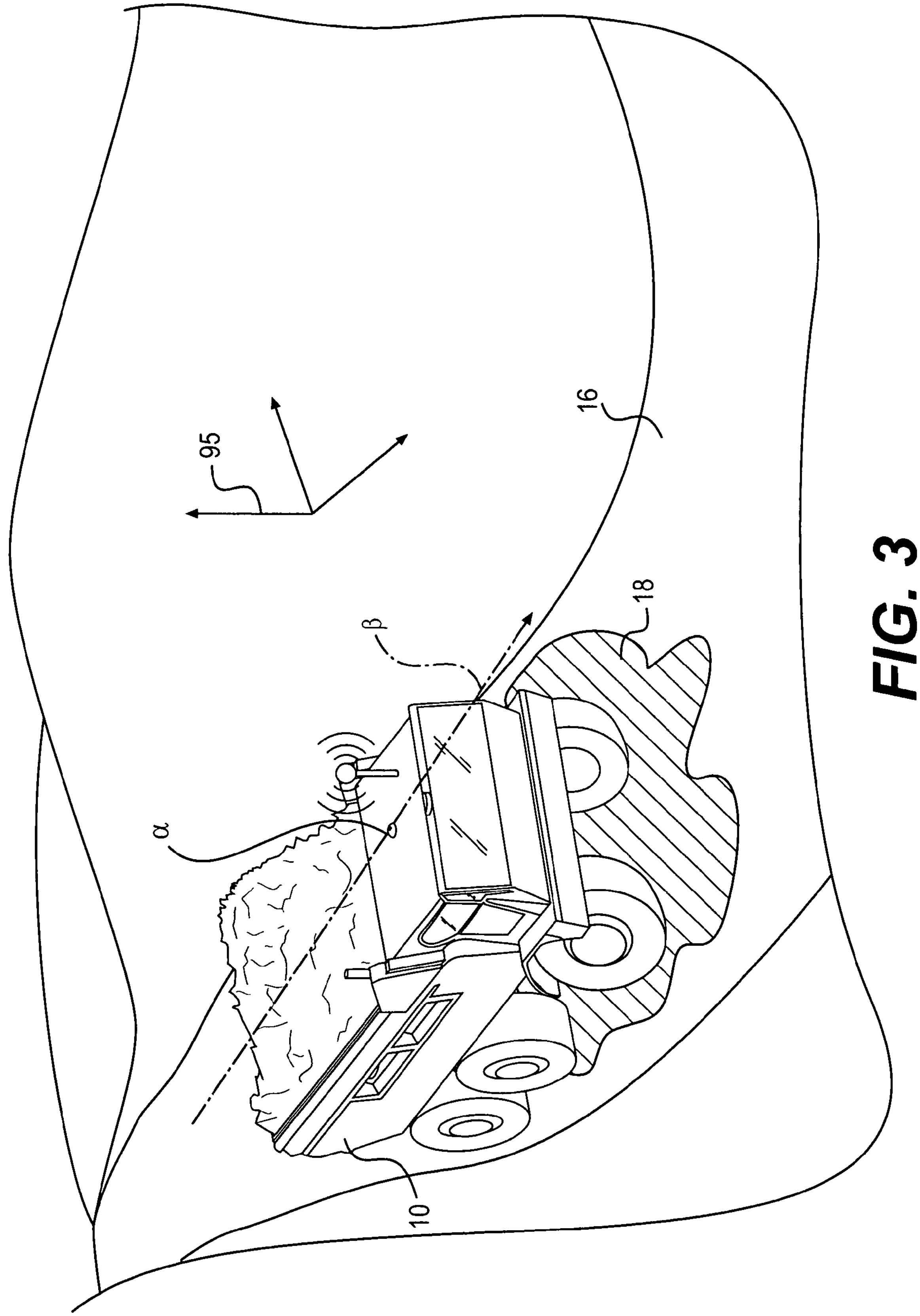
FIG. 3 is a pictorial illustration of one of the machines of FIG. 1 experiencing an exemplary disclosed slippage condition.

Pose device 50 may determine a location and an orientation of machine 10 relative to a local reference point, a coordinate system associated with worksite 17, a coordinate system associated with Earth, or another type of fixed coordinate system. For example, pose device 50 may determine the location and orientation of machine 10 relative to a fixed coordinate system 95, as illustrated in FIG. 3. Pose device 50 may include locator 40 (referring to FIG. 2) to determine the location of machine 10 and an orientation device 100 (referring to FIG. 2) to determine the orientation of machine 10.

Locator 40 may receive and analyze high-frequency, low power radio or laser signals from multiple locations to triangulate a relative location. For example, locator 40 may include an electronic receiver configured to communicate with one or more satellites, or a local radio or laser transmitting system to determine a relative 2-D or 3-D location of machine 10. Alternatively or additionally, locator 40 may include an Inertial Reference Unit (IRU), odometric or dead-reckoning positioning device, or another known locating device operable to receive or determine a relative 2-D or 3-D location of machine 10. Locator 40 may generate and communicate to controller 35 a signal indicative of the location of machine 10 in coordinate system 95 (hereafter the "location of machine 10"). As illustrated in FIG. 3, the location of machine 10 may be a machine location $\alpha$.

Orientation device 100 may include laser-level sensors, tilt sensors, inclinometers, or other known devices operable to determine a relative pitch and/or a relative roll of machine 10. Orientation device 100 may also include a radio direction finder, a gyrocompass, a fluxgate compass, or another known device operable to determine a relative yaw of machine 10. Orientation device 100 may generate and communicate to controller 35 a signal indicative of a heading of machine 10 with respect to coordinate system 95 (hereafter the "heading of machine 10"). As illustrated in FIG. 3, the heading of machine 10 may be a heading A, which may have a direction corresponding to a combination of the pitch and the yaw of machine 10 with respect to coordinate system 95.

Steering angle sensor 55 may determine a steering angle of machine 10. This steering angle may be measured with respect to heading β. Steering angle sensor 55 may generate and communicate to controller 35 a signal indicative of the determined steering angle with respect to heading β (hereafter the "steering angle of machine 10").

Traction device speed sensor 60 may determine speeds of one or more traction devices of machine 10 (hereafter the "traction device speed of machine 10"). For example, the one or more traction devices may be in the form of tracks or wheels. Traction device speed sensor 60 may generate and communicate to controller 35 a signal indicative of the determined traction device speed of machine 10.

Accelerometer 65 may determine an acceleration of machine 10 with respect to coordinate system 95. Accelerometer 65 may generate and communicate to controller 35 a signal indicative of the determined acceleration of machine 10.

Clock 75 may periodically communicate a signal indicative of a time to other response system 30 components. These components may append the time to information communicated to controller 35. Controller 35 may use the appended time to synchronize received information from several components. For example, controller 35 may synchronize by time the steering angle of machine 10 and the traction device speed of machine 10.

Transmitter 80 may transmit, through a communications link, signals to worksite control facility 93, another machine 10, and/or another offboard system. Transmitter 80 may include hardware and/or software that enables transmitter 80 to transmit the signals through the communications link. The signals may include satellite, cellular, infrared, radio, and/or other types of wireless communication that enable transmitter 80 to transmit the signals to offboard systems. Alternatively, the signals may include electrical, optical, and/or other types of wired communication that enable transmitter 80 to transmit the signals to offboard systems.

Receiver 85 may receive, through a communications link, signals from worksite control facility 93, another machine 10, and/or another offboard system. Receiver 85 may include hardware and/or software that enables receiver 85 to receive the signals through the communications link. The signals may include satellite, cellular, infrared, radio, and/or other types of wireless communication that enable receiver 85 to receive the signals from offboard systems. Alternatively, the signals may include electrical, optical, and/or other types of wired communication that enable receiver 85 to receive the signals from offboard systems.

Figure 4:
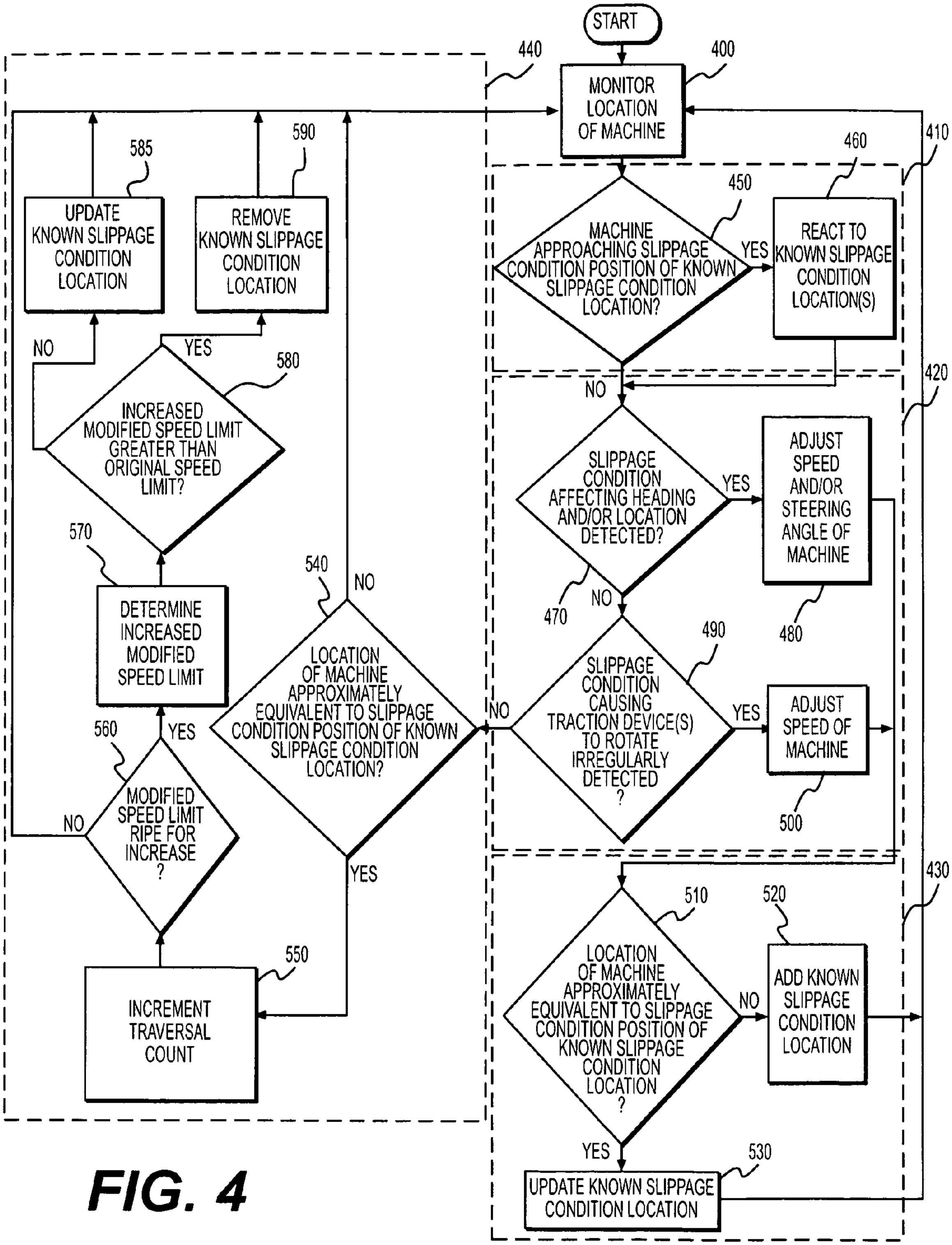
FIG. 4 is a flow chart describing an exemplary disclosed method of operating the response system of FIG. 2.

FIG. 4 illustrates an exemplary method of operating response system 30 to automatically control machine 10 in anticipation of or in response to a slippage condition of machine 10. FIG. 4 will be discussed in the following section to further illustrate response system 30 and its operation.

INDUSTRIAL APPLICABILITY

The disclosed system may be applicable to mobile machines. The system may minimize the effect of unpredictable portions of road surfaces along which the machines travel. In particular, the system may automatically control the machines in anticipation of or in response to slippage conditions, which may be experienced by the machines at unpredictable portions of road surfaces. Operation of the system will now be described.

As illustrated in FIG. 4, response system 30 (referring to FIG. 2), and more specifically, controller 35, may monitor with locator 40 the location of machine 10 (step 400). Controller 35 may then monitor and react to known slippage condition locations (step 410). Next, controller 35 may detect and react to a slippage condition of machine 10 (step 420). If a slippage condition is detected, controller 35 may decrease the speed limit at the location of machine 10 by adding a known slippage condition location to or updating a known slippage condition location of map 78 (step 430). Otherwise, controller 35 may increase the speed limit at the location of machine 10 by updating a known slippage condition location of or removing a known slippage condition location from map 78 (step 440). Alternatively, controller 35 may leave unchanged the speed limit at the location of machine 10. Controller 35 may then proceed back to step 400 and again monitor the location of machine 10.

The monitoring of and the reaction to the known slippage condition locations (step 410) may include sub-steps. In particular, controller 35 may determine whether machine 10 is approaching any slippage condition positions of known slippage condition locations stored in map 78 (sub-step 450). For example, controller 35 may compare the location of machine 10 (monitored during step 400) to the slippage condition position of each known slippage condition location stored in map 78. If machine 10 is approaching none of these known slippage condition locations (i.e., if the location and the heading of machine 10 are such that machine 10 will traverse none of the slippage condition positions within a threshold time), controller 35 may proceed to step 420. Otherwise, controller 35 may react to the known slippage condition location(s) including the slippage condition position(s) machine 10 is approaching (i.e., the slippage condition position(s) machine 10 will traverse within the threshold time) (sub-step 460). For example, controller 35 may adjust the speed of machine 10 to correspond to the modified speed limit(s) of the known slippage condition location(s). Alternatively, if the modified speed limit(s) is/are lower than a threshold speed limit, controller 35 may stop movement of machine 10, or may steer machine 10 around the slippage condition position(s) of the known slippage condition location(s). For example, the threshold speed limit may be selected based on the type of worksite 17. In particular, the threshold speed limit may be selected to prevent operations at worksite 17 from becoming prohibitively inefficient. It should be noted that steering machine 10 around the slippage condition position(s) of the known slippage condition location(s) may prevent controller 35 from increasing the modified speed limit(s) of the known slippage condition location(s). Therefore, even when a modified speed limit is lower than the threshold speed limit, machine 10 may sometimes traverse a slippage condition position. For example, these traversals may occur when a predetermined amount of time has elapsed since the time at which a slippage condition was last experienced at the slippage condition position.

The detection of and the reaction to a slippage condition of machine 10 (step 420) may also include sub-steps. In particular, controller 35 may monitor parameters indicative of a slippage condition of machine 10 affecting the heading and/or location of machine 10 (sub-step 470). Specifically, controller 35 may communicate with the sensors of sensing system 45 to monitor these parameters. Controller 35 may analyze the parameters to detect a slippage condition. This analysis may vary according to how the slippage condition affects machine 10.

Controller 35 may analyze the location of machine 10 (sensed by locator 40) and the traction device speed of machine 10 (sensed by traction device speed sensor 60) to detect a slippage condition that affects the location of machine 10. In particular, controller 35 may receive from locator 40 a signal indicative of a location of machine 10 at a first time. Controller 35 may also receive from traction device speed sensor 60 a signal indicative of a traction device speed of machine 10 at the first time. Using methods known in the art of autonomous vehicles, controller 35 may predict a location of machine 10 at a second time based on the location of machine 10 at the first time and the traction device speed of machine 10 at the first time. Controller 35 may also receive from locator 40 a signal indicative of an actual location of machine 10 at the second time. Controller 35 may compare the predicted location of machine 10 at the second time to the actual location of machine 10 at the second time. Controller 35 may detect a slippage condition of machine 10 at the location of machine 10 at the first time if the predicted location of machine 10 at the second time is more than a threshold distance from the actual location of machine 10 at the second time. This threshold distance may be related to the type of worksite 17. For example, the threshold distance at a quarry may be greater than the threshold distance at a construction site. Alternatively or additionally, the threshold distance may be related to the type of machine 10. For example, the threshold distance for an off-highway haul truck may be greater than the threshold distance for an on-highway haul truck.

Controller 35 may analyze the heading of machine 10 (sensed by orientation device 100), the steering angle of machine 10 (sensed by steering angle sensor 55), and the traction device speed of machine 10 (sensed by traction device speed sensor 60) to detect a slippage condition that affects the heading of machine 10. In particular, controller 35 may receive from orientation device 100 a signal indicative of a heading of machine 10 at a first time. Controller 35 may also receive from steering angle sensor 55 a signal indicative of a steering angle of machine 10 at the first time. Additionally, controller 35 may receive from traction device speed sensor 60 a signal indicative of a traction device speed of machine 10 at the first time. Using methods know in the art of autonomous vehicles, controller 35 may predict a heading of machine 10 at a second time based on the heading of machine 10 at the first time, the steering angle of machine 10 at the first time, and the traction device speed of machine 10 at the first time. Controller 35 may also receive from orientation device 100 a signal indicative of an actual heading of machine 10 at the second time. Controller 35 may compare the predicted heading of machine 10 at the second time to the actual heading of machine 10 at the second time. Controller 35 may detect a slippage condition of machine 10 at the location of machine 10 at the first time (sensed by locator 40) if the predicted heading of machine 10 at the second time differs by more than a threshold angle from the actual heading of machine 10 at the second time. This threshold angle may be related to the type of worksite 17. For example, the threshold angle at a quarry may be greater than the threshold angle at a construction site. Alternatively or additionally, the threshold angle may be related to the type of machine 10. For example, the threshold angle for an off-highway haul truck may be greater than the threshold angle for an on-highway haul truck.

If a slippage condition of machine 10 affecting the location and/or heading of machine 10 is detected, controller 35 may adjust the speed and/or steering angle of machine 10 (sub-step 480). For example, controller 35 may downwardly adjust the speed of machine 10. Alternatively, controller 35 may adjust the steering angle of machine 10 such that machine 10 is steered into the skid. Controller 35 may then proceed to step 430.

Before, after, or concurrent with sub-step 470, controller 35 may monitor parameters indicative of a slippage condition of machine 10 causing one or more traction devices of machine 10 to rotate irregularly (sub-step 490). Similar to sub-step 470, controller 35 may communicate with the sensors of sensing system 45 to monitor these parameters. Specifically, controller 35 may analyze the traction device speed of machine 10 (sensed by traction device speed sensor 60) and the acceleration of machine 10 (sensed by accelerometer 65) to detect a slippage condition that causes one or more traction devices of machine 10 to rotate irregularly. For example, traction devices in the form of wheels may rotate irregularly. Alternatively, sprockets associated with traction devices in the form of tracks may rotate irregularly. In particular, controller 35 may receive from traction device speed sensor 60 a signal indicative of a traction device speed of machine 10 at a first time. Controller 35 may also receive from accelerometer 65 a signal indicative of an acceleration of machine 10 between the first time and a second time. Using methods known in the art of autonomous vehicles, controller 35 may predict a traction device speed of machine 10 at the second time based on the traction device speed of machine 10 at the first time and the acceleration of machine 10 between the first time and the second time. Controller 35 may also receive from traction device speed sensor 60 a signal indicative of an actual traction device speed of machine 10 at the second time. Controller 35 may compare the predicted traction device speed of machine 10 at the second time to the actual traction device speed of machine 10 at the second time. Controller 35 may detect a slippage condition of machine 10 at the location of machine 10 at the first time (sensed by locator 40) if the predicted traction device speed of machine 10 differs by more than a threshold speed from the actual traction device speed of machine 10 at the second time. This threshold speed may be related to the type of worksite 17. For example, the threshold speed at a quarry may be greater than the threshold speed at a construction site. Alternatively or additionally, the threshold speed may be related to the type of machine 10. For example, the threshold speed for an off-highway haul truck may be greater than the threshold speed for an on-highway haul truck.

If a slippage condition of machine 10 causing one or more traction devices of machine 10 to rotate irregularly is detected, controller 35 may adjust the speed of machine 10 (sub-step 500). For example, controller 35 may downwardly adjust the speed of machine 10. Controller 35 may then proceed to step 430.

Decreasing the speed limit at the location of machine 10 (step 430) may include sub-steps. In particular, controller 35 may determine whether the location of machine 10 is approximately equivalent to any slippage condition positions of known slippage condition locations stored in map 78 (sub-step 510). For example, controller 35 may compare the location of machine 10 (monitored during step 400) to the slippage condition position of each known slippage condition location stored in map 78.

If the location of machine 10 is approximately equivalent to none of these slippage condition positions, controller 35 may add a known slippage condition location to map 78 (sub-step 520). This known slippage condition location may have a slippage condition position equivalent to the location of machine 10; a modified speed limit determined by decreasing the original speed limit at the location of machine 10; a traversal count of zero; and/or a time at which the slippage condition was experienced. The amount of the decrease to the original speed limit may vary based on the type of slippage condition. For example, the amount of the decrease to the original speed limit may be larger for slippage conditions affecting the heading and/or location of machine 10 than for slippage conditions causing one or more traction devices of machine 10 to rotate irregularly. The amount of the decrease to the original speed limit may also vary based on the original speed limit at the location of machine 10. For example, the amount of the decrease to the original speed limit may be a predetermined percentage of the original speed limit. Alternatively, the amount of the decrease to the original speed limit may be a predetermined amount. In yet another alternative, the amount of the decrease to the original speed limit may be equivalent to the original speed limit. In other words, the original speed limit may be decreased to zero. Controller 35 may then proceed to step 400 and again monitor the location of machine 10.

If the location of machine 10 is approximately equivalent to one of the slippage condition positions, controller 35 may update this slippage condition position's known slippage condition location (sub-step 530). Specifically, controller 35 may decrease the modified speed limit of the known slippage condition location. The amount of the decrease to the modified speed limit may vary based on the type of slippage condition. For example, the amount of the decrease to the modified speed limit may be larger for slippage conditions affecting the heading and/or location of machine 10 than for slippage conditions causing one or more traction devices of machine 10 to rotate irregularly. The amount of the decrease to the modified speed limit may also vary based on the modified speed limit at the location of machine 10. For example, the amount of the decrease to the modified speed limit may be a predetermined percentage of the modified speed limit. Alternatively, the amount of the decrease to the modified speed limit may be a predetermined amount. In yet another alternative, the amount of the decrease to the modified speed limit may be equivalent to the modified speed limit. In other words, the modified speed limit may be decreased to zero. Controller 35 may also set the traversal count to zero. Additionally or alternatively, controller 35 may set the time to the time at which the slippage condition was experienced. Controller 35 may then proceed to step 400 and again monitor the location of machine 10.

Increasing the speed limit at the location of machine 10 (step 440) may include sub-steps. In particular, controller 35 may determine whether the location of machine 10 is approximately equivalent to any slippage condition positions of known slippage condition locations stored in map 78 (sub-step 540). For example, controller 35 may compare the location of machine 10 (monitored during step 400) to the slippage condition position of each known slippage condition location stored in map 78. If the location of machine 10 is approximately equivalent to none of these slippage condition positions, controller 35 may proceed to step 400 and again monitor the location of machine 10.

If the location of machine 10 is approximately equivalent to one of the slippage condition positions, controller 35 may increment the traversal count of this slippage condition position's known slippage condition location (sub-step 550). Next, controller 35 may determine whether the modified speed limit of this known slippage condition location is ripe for increase (sub-step 560). In other words, controller 35 may determine whether a circumstance at the slippage condition position of the known slippage condition location may have changed since a slippage condition was last experienced at the slippage condition position of the known slippage condition location. For example, the modified speed limit may be ripe for increase if the traversal count of the known slippage condition location exceeds a predetermined threshold count. Alternatively, the modified speed limit may be ripe for increase if the time elapsed since the time at which a slippage condition was last experienced exceeds a predetermined threshold time. In yet another alternative, the modified speed limit may be ripe for increase if (1) the traversal count exceeds the threshold count and (2) the time elapsed exceeds the threshold time. It is contemplated that the threshold count and/or the threshold time may be selected to increase or decrease the likelihood that the modified speed limit is ripe for increase. For example, this likelihood may be increased by decreasing the threshold count and/or the threshold time. If the modified speed limit is not ripe for increase, controller 35 may proceed to step 400 and again monitor the location of machine 10.

If the modified speed limit is ripe for increase, controller 35 may determine an increased modified speed limit of the known slippage condition location (sub-step 570). The amount of the increase to the modified speed limit may vary based on the modified speed limit at the location of machine 10. For example, the amount of the increase to the modified speed limit may be a predetermined percentage of the modified speed limit. Alternatively, the amount of the increase to the modified speed limit may be a predetermined amount.

Next, controller 35 may determine whether the determined increased modified speed limit of the known slippage condition location is greater than the original speed limit (sub-step 580). If the determined increased modified speed limit is not greater than the original speed limit, controller 35 may update the known slippage condition location to include the determined increased modified speed limit (sub-step 585). Otherwise, controller 35 may remove the known slippage condition location from map 78 (sub-step 590), thereby removing the modified speed limit. Controller 35 may then proceed to step 400 and again monitor the location of machine 10.

It is contemplated that a plurality of machines 10 at worksite 17 may include response systems 30, each being operated in accordance with steps 400-440. These response systems 30 may collectively minimize the effect of unpredictable portions 18 by automatically controlling machines 10 in anticipation of or in response to unpredictable portions 18. In particular, a response system 30 of a first machine 10 may detect and react to a slippage condition during step 420. This slippage condition may correspond to one of unpredictable portions 18. The first machine 10 may then add a known slippage condition location to map 78 during step 430, the known slippage condition location including a slippage condition position and a modified speed limit. As previously discussed, map 78 may be stored in and updated by an offboard system. For example, the offboard system may be worksite control facility 93 and/or a second machine 10.

A response system 30 of the second machine 10 may, during step 410, adjust a speed of the second machine 10 to correspond to the modified speed limit as the second machine approaches the slippage condition position of the known slippage condition location. The response system 30 of the second machine 10 may also decrease the modified speed limit of the known slippage condition location during step 430 if it detects a slippage condition at the slippage condition position of the known slippage condition location during step 420. Alternatively, the response system 30 of the second machine 10 may increase or leave unchanged the modified speed limit of the known slippage condition location during step 440 if it fails to detect a slippage condition at the slippage condition position of the known slippage condition location during step 420.

It is contemplated that by repeating steps 400-440, response systems 30 may iteratively increase and/or decrease the modified speed limit. These increases and/or decreases may maximize the modified speed limit, while minimizing slippage conditions of machines 10. In particular, the modified speed limit may be decreased when a slippage condition is detected, minimizing future slippage conditions of machines 10. And, the modified speed limit may be increased when the modified speed limit is ripe for increase (i.e., when a circumstance at the slippage condition position of the known slippage condition location may have changed), maximizing the modified speed limit and eventually replacing the modified speed limit with the original speed limit.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A slippage condition response system for a machine, comprising:

a sensing system configured to sense a parameter indicative of a slippage condition of the machine;

a locator configured to sense a parameter indicative of a location of the machine;

a map configured to store at least one known slippage condition location, each known slippage condition location including:

a slippage condition position, and a modified speed limit; and a controller in communication with the sensing system, the locator, and the map, the controller being configured to:

monitor the location of the machine, monitor the parameter indicative of a slippage condition of the machine, and update the map, based on the monitored parameter and the monitored location.

2. The slippage condition response system of claim 1, wherein the locator is included in the sensing system.

3. The slippage condition response system of claim 1, wherein the map is stored in and updated by an offboard system.

4. The slippage condition response system of claim 3, wherein the offboard system includes a worksite control facility.

5. The slippage condition response system of claim 1, wherein the sensing system includes at least one of a pose device, a steering angle sensor, a traction device speed sensor, or an accelerometer.

6. The slippage condition response system of claim 1, wherein each known slippage condition location further includes a traversal count indicative of a number of traversals of the slippage condition position of the known slippage condition location, wherein the traversals are:

at the modified speed limit of the known slippage condition location, and without experiencing a slippage condition.

7. A slippage condition response system for a machine, comprising:

a locator configured to sense a parameter indicative of a location of the machine;

a map configured to store at least one known slippage condition location, each known slippage condition location including:

a slippage condition position, and a modified speed limit; and a controller in communication with the locator and the map, the controller being configured to:

monitor the location of the machine, and adjust a speed of the machine, based on the monitored location and the map.

8. The slippage condition response system of claim 7, further including a sensing system configured to sense a parameter indicative of a slippage condition of the machine, wherein the controller is in communication with the sensing system and is further configured to:

monitor the parameter indicative of a slippage condition of the machine, and update the map, based on the monitored parameter and the monitored location.

9. The slippage condition response system of claim 8, wherein the sensing system includes at least one of the locator, a pose device, a steering angle sensor, a traction device speed sensor, or an accelerometer.

10. The slippage condition response system of claim 7, wherein each known slippage condition location further includes a traversal count indicative of a number of traversals of the slippage condition position of the known slippage condition location, wherein the traversals are:

at the modified speed limit of the known slippage condition location, and without experiencing a slippage condition.

11. The slippage condition response system of claim 7, wherein each known slippage condition location further includes a time at which a slippage condition was last experienced at the slippage condition position of the known slippage condition location.

12. The slippage condition response system of claim 7, wherein the map is stored in and updated by an offboard system.

13. A method of responding to a slippage condition, comprising:

monitoring a location of a first machine;

determining, based on the monitored location of the first machine, that the first machine is approaching a slippage condition position of a known slippage condition location stored in a map, the known slippage condition location also including a modified speed limit; and adjusting a speed of the first machine, based on the modified speed limit of the known slippage condition location.

14. The method of claim 13, further including:

monitoring a location of a second machine;

monitoring a parameter indicative of a slippage condition of the second machine; and updating the map, based on the monitored location of the second machine and the monitored parameter indicative of a slippage condition of the second machine.

15. The method of claim 13, further including:

monitoring a parameter indicative of a slippage condition of the first machine; and updating the map, based on the monitored location of the first machine and the monitored parameter indicative of a slippage condition of the first machine.

16. The method of claim 15, wherein the monitoring of the parameter indicative of a slippage condition of the first machine includes monitoring a parameter indicative of a slippage condition of the first machine affecting at least one of a heading or the location of the first machine.

17. The method of claim 15, wherein the monitoring of the parameter indicative of a slippage condition of the first machine includes monitoring a parameter indicative of a slippage condition of the first machine causing one or more traction devices of the first machine to rotate irregularly.

18. The method of claim 15, wherein:

the known slippage condition location further includes a traversal count indicative of a number of traversals of the slippage condition position of the known slippage condition location, wherein the traversals are:

at the modified speed limit of the known slippage condition location, and without experiencing a slippage condition; and the updating of the map includes incrementing the traversal count.

19. The method of claim 15, wherein:

the known slippage condition location further includes a time at which a slippage condition was last experienced at the slippage condition position of the known slippage condition location; and the updating of the map includes setting the time.

20. The method of claim 15, wherein the updating of the map includes adding a known slippage condition location to the map.

* * * * *